United States Patent [19]

Matsuzaki et al.

[11] 4,160,713
[45] Jul. 10, 1979

[54] PROCESS FOR ELECTRO-DIALYSIS

[75] Inventors: Harumi Matsuzaki; Sankichi Takahashi; Osamu Kuroda, all of Hitachi, Japan

[73] Assignees: Hitachi, Ltd.; Hitachi Plant Engineering and Construction Co., Ltd., both of Japan

[21] Appl. No.: 873,680

[22] Filed: Jan. 30, 1978

[30] Foreign Application Priority Data

Jan. 31, 1977 [JP] Japan .................................. 52-8665
Jan. 31, 1977 [JP] Japan .................................. 52-8666

[51] Int. Cl.² .............................................. B01D 13/02
[52] U.S. Cl. .................................. 204/180 P; 204/301; 426/239
[58] Field of Search ........................... 204/180 P, 301; 426/239

[56] References Cited

U.S. PATENT DOCUMENTS

3,870,613  3/1975  Nakamura et al. ............... 204/180 P

*Primary Examiner*—Arthur C. Prescott
*Attorney, Agent, or Firm*—Thomas E. Beall, Jr.

[57] ABSTRACT

In a process for electro-dialysis which comprises passing an electrolyte through dilution chambers and concentration chambers formed between a large number of alternately counterposed anion exchange membranes and cation exchange membranes, and applying an electric potential to a pair of electrodes provided at both ends of a plurality of these chambers, thereby migrating ions in the electrolyte through the membranes and effecting dilution or concentration of the electrolyte, such a volumic rate of air bubbles is introduced to the lower parts of the dilution chambers as to make the thickness of a diffusion layer formed by concentration polarization near the ion exchange membranes in the dilution chambers smaller than when air bubbles are not introduced thereto, and make the resistance between the electrodes smaller than when the air bubbles are not introduced thereto. Superficial air velocity of air bubbles introduced into the dilution chambers is preferably 1–4 cm/sec.

19 Claims, 8 Drawing Figures

PROCESS FOR ELECTRO-DIALYSIS

LIST OF PRIOR ART REFERENCES (37 CFR 1.56 (a))

The following references are cited to show the state of the art.
U.S. Pat. No. 3,870,613
Japanese Patent Publication No. 1334/66
Japanese Utility Model Publication No. 24764/60
U.S. Patent Application Ser. No. 800,970

This invention relates to a process for electro-dialysis, and more particularly to a process for electro-dialysis suitable for an electro-dialysis apparatus of filter press type for diluting or concentrating an electrolyte by means of electro-dialysis membranes.

The electrodialysis apparatus is widely utilized in concentration of sea water, etc., desalting of saline water, treatment of effluent water containing salts, etc.

In the electro-dialysis apparatus of filter press type, cation exchange membranes, anion exchange membranes and frames having a center opening are alternately stacked one upon another, and clamped in the same manner as in the filter press, whereby the membranes and the frames are pressed one upon another to maintain water tightness therebetween and form dilution chambers or concentration chambers within the frames.

U.S. Pat. No. 3,870,613 relates to an electro-dialysis apparatus of filter press type having an object of preventing protein of milks from deposition onto ion exchange membranes and simultaneously preventing scale components such as calcium phosphate, etc. from deposition in concentration chambers. To attain said object, said prior art employs the following three steps. That is, the three steps are dispersion of air bubbles through a solution to be treated in dilution chambers, passage of the solution to be treated at a linear velocity of 5 cm/sec. or higher, and intermittent reversal of polarities of electrodes. The protein of milks is removed mainly by the dispersion of air bubbles. Calcium phosphate to be deposited in the concentration chambers is prevented from the deposition mainly by the reversal of the polarities of electrodes. That is, when concentration chambers and dilution chambers are shifted to each other by reversing the polarities of electrodes before the concentration of the solution to be treated in the concentration chambers reaches a saturation solubility of electro-dialysis, the concentration of the solution in the concentration chambers does not reach the saturation solubility, and thus the deposition of calcium phosphate in the concentration chambers can be prevented. Principal object of the reversal of polarities is to pull out the protein of milks taken into the dialysis membranes in the dilution chambers from the membranes by the reversal of the polarities. Dispersion of air bubbles is carried out in both the dilution chambers and the concentration chambers in its embodiments, because the prior art is based on the reversal of the polarities, that is, because air bubbles can be always dispersed in the dilution chambers even after the reversal of the polarities. Therefore, in the prior art, the air bubbles are introduced substantially into the dilution chambers.

Other relevant prior arts are given below:

(1) Japanese Patent Publication No. 1334/66 discloses a process for preventing concentration polarization on the surfaces of ion exchange membranes with the view of preventing occurrence of concentration polarization, formation of precipitates or lowering of effective current efficiency due to formation of a laminar film of low concentration on the surfaces of the ion exchange membranes. To attain the object, such an amount of air bubbles is introduced into dilution chambers as to vibrate the membrane surfaces in the dilution chambers in the prior art.

(2) Japanese Utility Model Publication No. 24764/60 relates to an improved electrolytic concentration cell and discloses an electro-dialysis apparatus of unit cell type, which is comprised of bag-form unit cells, each having a cation exchange membrane at one side and an anion exchange membrane at other side, where a concentrated solution is taken out of the unit cells serving as concentration cells. The object of the prior art is to prevent deposition and accumulation of solid matters in the electrolytic concentration cells. To attain the object, the prior art employs introduction of air bubbles to the bottoms or side walls of dilution layers.

(3) U.S. Patent Application Ser. No. 800,970, filed on June 28, 1977, entitled "Dialysis Method and Apparatus therefore" in the name of Harumi Matsuzaki et al and assigned to the same assignee as in the present application, is directed to an efficient dialysis treatment of a solution containing suspensoids, etc. without any trouble due to membrane fouling, etc. To attain the desired object, the prior art employs dispersion of air bubbles at least to dilution chambers.

As described above, it is well known to introduce air bubbles at least to dilution chambers of an electro-dialysis apparatus to prevent disposition or accumulation of solid matters in the dilution chambers of the electro-dialysis apparatus.

However, no disclosure has been so far made of a concrete method of increasing a treating efficiency of the electro-dialysis apparatus and reducing a treating cost in concentration or desalting of a solution to be treated, while preventing deposition or accumulation of precipitates, etc. in dilution chambers of the electro-dialysis apparatus.

An object of the present invention is to provide a process for electro-dialysis having increased treating rates of dilute solution and concentrated solution.

The present invention is characterized by introducing such a volumic rate of air bubbles to lower parts of dilution chambers as to make the thickness of a diffusion layer formed by concentration polarization near the ion exchange membranes in the dilution chambers smaller than when air bubbles are not introduced thereto, and make the resistance between electrodes smaller than when the air bubbles are not introduced thereto, where a superficial air velocity of the air bubbles introduced into the dilution chambers is preferably 1–4 cm/sec.

The present invention will be described in detail below, referring to the accompanying drawings.

Figure 1:
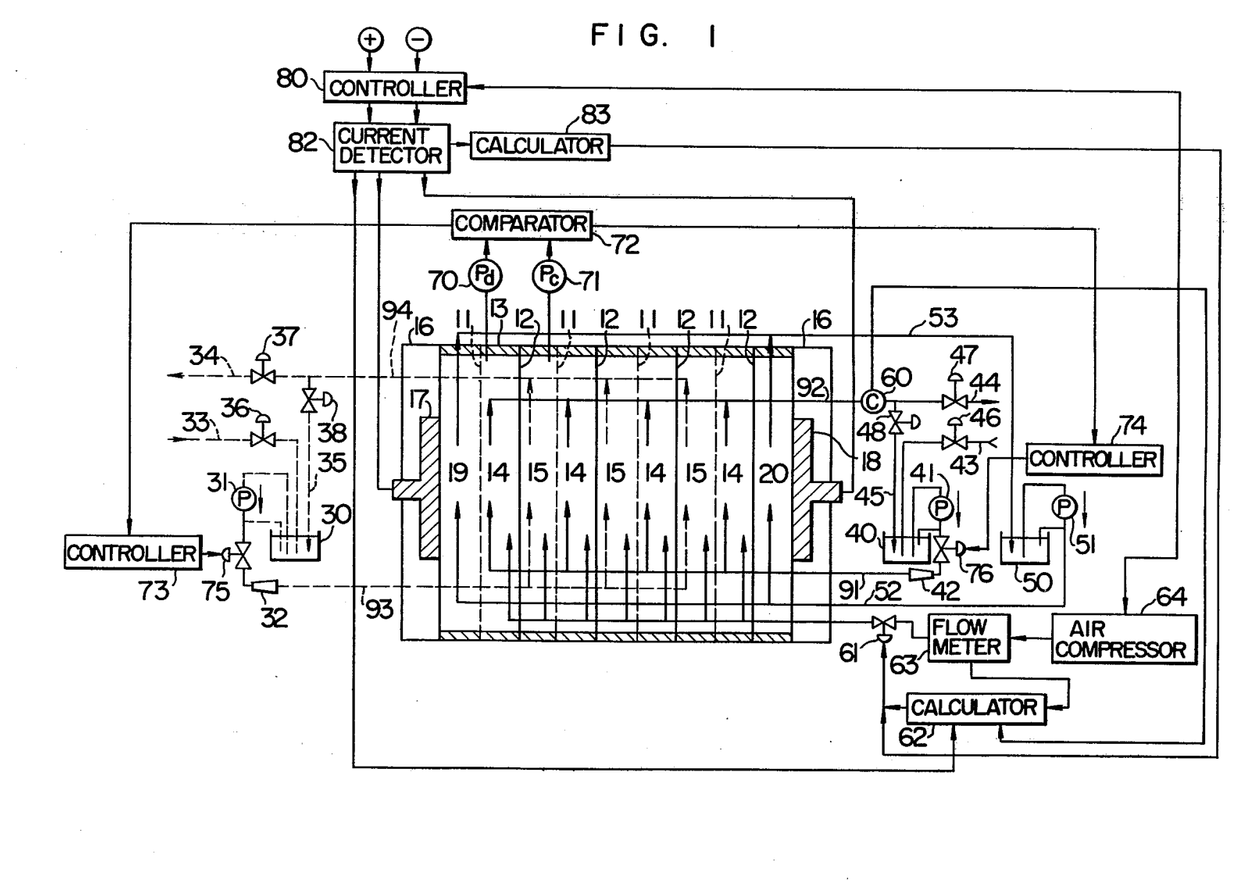
FIG. 1 is a schematic flow diagram of an electro-dialysis apparatus according to one embodiment of the present invention.

In FIG. 1, an electro-dialysis apparatus according to one embodiment of the present invention is shown, where numeral 11 is anion exchange membranes and 12 cation exchange membranes. Frames 13 are arranged in close contact with the anion exchange membranes 11 and cation exchange membranes 12, so that center opening of the frames 13 can constitute dilution chambers 14 and concentration chambers 15 alternately.

Numeral 16 is fastening plates, by which an apparatus is integrally fastened from its both ends, after the apparatus has been assembled. Numeral 18 is an anode electrode and numeral 17 is a cathode electrode. The electrodes face the ion exchange membranes, and are integrated with the fastening plates. An electrode solution circulates through the spaces between the fastening plates 16 and the outermost ion exchange membranes at both ends. Numeral 52 is an inlet to the circulation passage of the electrode solution, and numeral 53 an outlet from the circulation passage. Electrode chambers 19 and 20 are formed between the electrodes 17 and 18, and the outermost ion exchange membranes, respectively.

Numeral 50 is an electrode solution tank, and numeral 51 a pump. The electrode solution circulates between the electrode solution tank 50 and the electrode chambers 19 and 20 by operation of the pump 51. Electrolyte solutions enter the apparatus from inlet pipes 91 and 93, and are taken out through outlet pipes 92 and 94, respectively. Initially, untreated electrolyte solutions are led to a concentrated solution tank 30 and a dilute solution tank 40 from inlet pipes 33 and 34 through valves 36 and 46, respectively. The electrolyte in the concentrated solution tank 30 is led into the concentration chambers 15 from supply holes formed on the frames 13 through pump 31, valve 75, ejector 32, and inlet pipe 93. The electrolyte solution in the dilute solution tank 40 is led to the dilution chambers 14 from supply holes formed on the frames 13 through pump 41, valve 76, ejector 42 and inlet pipe 91.

When an electric potential is applied to the electrodes 17 and 18, the electrolyte solution in the dilution chambers 14 is diluted and the electrolyte solution in the concentration chambers 15 is concentrated by ion migration due to electrophoresis of ions in the electrolyte solution and selective ion permeability of the ion exchange membranes. When the electrolyte solution in the dilution chambers 14 of concentration chambers 15 is diluted or concentrated to the desired concentration, the diluted electrolyte solution in the dilution chambers 14 is led to the outside of the apparatus from the grooves formed on the frames through outlet pipe 92, conductivity meter 60, valve 47, and outlet pipe 44, whereas the concentrated electrolyte solution in the concentration chambers 15 is led to the outside of the apparatus from grooves formed on the frames through outlet pipe 94, valve 37, and outlet pipe 34. If the electrolyte in the dilution chambers 14 or concentration chambers 15 is not diluted or concentrated to the desired concentration, the electrolyte solution in the dilution chambers 14 is once led to the dilute solution tank 40 through conductivity meter 60 and valve 48, and then led again to the dilution chambers 14 through inlet pipe 91 to repeat circulation, whereas the electrolyte solution in the concentration chambers 15 is once led to the concentrated solution tank through valve 38, and then led again to the concentration chambers 15 through inlet pipe 93 to repeat circulation.

Air bubbles are introduced from supply holes at the lower parts of the dilution chambers 14 and the concentration chambers 15. The air bubbles are led to the dilution chambers 14 and the concentration chambers 15 through compressor 64, flow meter 63 and valve 61. The air bubbles can be sometimes led only to the dilution chambers, as will be described later.

An absolute pressure of the electrolyte solution in the dilution chambers 14 is measured by a pressure gage 70, and an absolute pressure of the electrolyte solution in the concentration chambers 15 is measured by a pressure gage 71. Pressures measured by the pressure gages 70 and 71 are compared in a comparator 72, and valves 75 and 76 are controlled by output of comparator 72 through outputs of controllers 73 and 74, as will be described later.

The electrodes 17 and 18 are controlled, as regards start and discontinuation to apply the electric potential thereto, in a specific sequence, as will be described later.

Valve 61 is controlled by output from current detector 82 through output from calculator 83, which functions as will be described later. Valve 61 is also controlled by output from calculator 62 which functions in accordance with the conductivity meter 60, as will be described later.

Operating procedure for the conventional electro-dialysis apparatus comprises the following three steps:

(1) Introduce an electrolyte solution to dilution chambers and concentration chambers, while introducing an electrode solution to electrode chambers, (2) introduce air bubbles to dilution chambers (or both dilution chambers and concentration chambers), and apply an electric potential to electrodes, and (3) lead the resulting dilute solution and concentrated solution to the outside of the electro-dialysis apparatus.

The present invention relates to handling of the air bubbles in said step (2).

Figure 2:
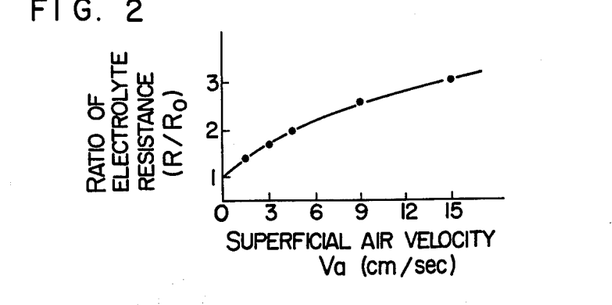
FIG. 2 is a graph showing relations between a superficial air velocity and a ratio of resistance between electrodes when air bubbles are introduced to dilution chambers to resistance between the electrodes when no air bubbles are introduced thereto (ratio of electrolyte resistance).

It is well known to bubble air between ion exchange membranes to remove suspended solid matters deposited on the ion exchange membranes, but according to the air bubbling of the prior art, generally a large amount of air must be bubbled in the dilution chambers or the concentration chambers, and thus an electric resistance between the ion exchange membranes is increased on the contrary, lowering the treating efficiency. Thus, such is not desirable for the electro-dialysis apparatus. Such relations are shown in FIG. 2, where a cell connected to a conductivity meter is placed in an aqueous sodium chloride solution at a predetermined concentration and a predetermined liquid temperature, a predetermined amount of air is bubbled between electrodes in the cell, and electroconductivity of the sodium chloride solution is measured for various air velocity. The abscissa indicates a superficial air velocity and the ordinate a ratio of electrolyte resistance (ratio of electric resistance R of a solution in gas-liquid mixed phase when air bubbles are introduced thereto to electric resistance $R_o$ of the solution when no air bubbles are introduced thereto). The superficial air velocity is a volumic rate of air introduced between the electrode per cross-sectional area in the horizontal direction between the counterposed cells. In that case an alternating current of 1000 Hz is passed between the electrodes in the cell of the conductivity meter to prevent occurrence of concentration polarization on the electrode surfaces. When the air bubbles are introduced between the electrodes, the resistance between the electrodes is increased with increasing air velocity, that is, increasing volumic rate of air bubbles introduced, as shown in FIG. 2.

It is evident from FIG. 2 that the introduction of air bubbles between the electrodes increases the electric resistance between the electrodes, which is not preferable in the treating efficiency.

As a result of extensive studies on the effect of introducing the air bubbles in the electro-dialysis, the present inventors have found that an introduction of a relatively small volumic rate of air bubbles, that is, not more than 16 cm/sec in terms of superficial air velocity, can reduce the concentration polarization at the ion exchange membrane in the electro-dialysis, and a ratio of limiting current density can be drastically increased in spite of said increase in electric resistance, as will be described in detail later, and have established the present invention.

Now, grounds for said restriction to the numerical range of the superficial air velocity will be described in detail below.

Experiments were conducted in a test electro-dialysis apparatus comprised of three dilution chambers, two concentration chambers, two electrode chambers and ion exchange membranes having an available membrane area of 21.3 dm$^2$/sheet, wherein air dispersion pipes for introducing air bubbles were provided at lower parts of the dilution chambers and the concentration chambers, and an aqueous sodium chloride solution of 1–30 m $v$/cm was passed through all the chambers as a test solution.

Figure 3:
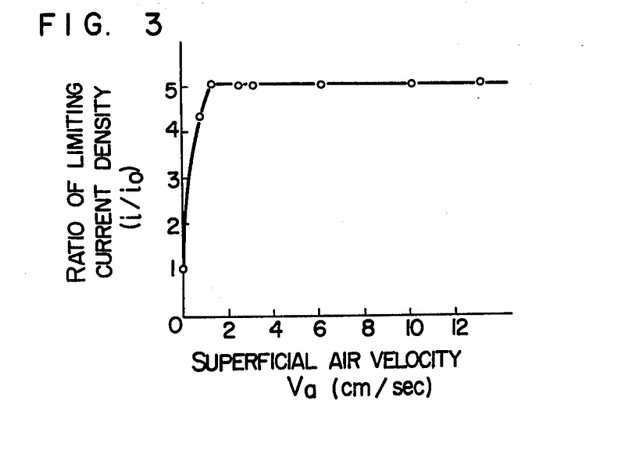
FIG. 3 is a graph showing relations between a superficial air velocity and a ratio of limiting current density.

In FIG. 3, relations between a superficial air velocity and a ratio of limiting current density (a ratio of a limiting current density i when the air bubbles are introduced to the chambers to a limiting current density io when no air bubbles are introduced thereto), using said test electro-dialysis apparatus are graphically shown. As is evident from FIG. 3, the limiting current density, which will be explained below, is drastically increased to more than 5-fold by the introduction of air bubbles, and the limiting current density becomes almost constant at a superficial air velocity Va of more than about 1.0 cm/sec.

Generally in the membrane separation process such as the process for electro-dialysis, etc., an electrolyte concentration of the solution near each surface of anion exchange membranes and cation exchange membranes will be lower in dilution chambers and higher in concentration chamber by migration of ions than the bulk electrolyte concentration (a concentration of the electrolyte solution far from the membrane surfaces), which is a phenomenon of the so-called concentration polarization.

When an electric potential applied between the electrodes is increased, migration of ions is promoted, and the electrolyte concentration of the solution at the membrane surfaces will be zero in the dilution chambers. The current between the electrodes at that time is a limiting current, and the limiting current per unit membrane area is called a limiting current density.

When electro-dialysis is carried out at the limiting current density, electrolysis of water takes place at the membrane surfaces, which disadvantageously will deteriorate the membranes and will simultaneously promote fouling of the membranes by scales of sparingly soluble compounds. Thus, the electro-dialysis is usually carried out below the limiting current density. However, since electro-dialysis at a higher current density can reduce an equipment cost, and a treating efficiency of a solution to be concentrated is not lowered even with increasing difference in concentrations between the dilution chambers and the concentration chambers, it is desirable to carry out the electro-dialysis at a higher current density.

Figure 4:
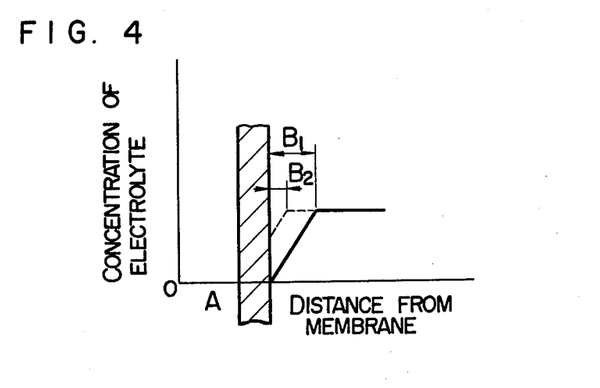
FIG. 4 is a schematic diagram of a concentration of electrolyte to a distance from a membrane showing an effect of the present invention.

The present invention will be further explained, referring to the schematic diagram of FIG. 4.

Supply of ions to a diffusion layer at an ion exchange membrane A is promoted by stirring of an electrolyte solution of air bubbling under the same applied electric potential, and the thickness of the diffusion layer $B_1$ is decreased to $B_2$, whereby a concentration polarization is reduced, as indicated by dotted line, where $B_1$ shows the thickness of diffusion layer when no air is bubbled, and $B_2$ the thickness of diffusion layer when a predetermined volumic rate of air is bubbled. The reduction in the thickness of diffusion layer will decrease an electric resistance between electrodes, and the increase in electrolyte concentration of solution at the membrane surface permits to increase an electric potential to the electrodes until the electrolyte concentration of the solution at the membrane surface becomes zero. That is, the electro-dialysis can be carried out at a higher current density by air bubbling to the surface of ion exchange membrane.

Figure 5:
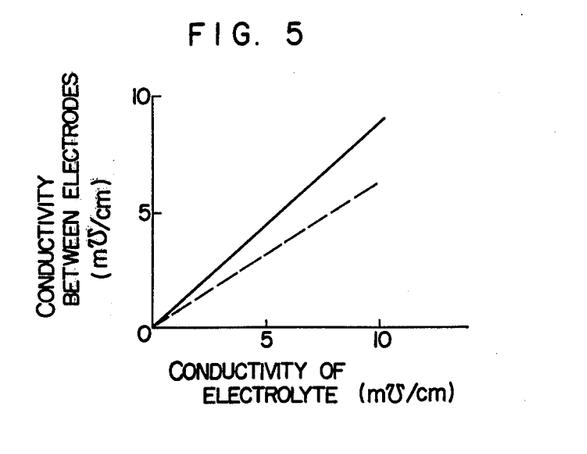
FIG. 5 is a graph showing relations between a conductivity of electrolyte and a conductivity between electrodes.

Experimental results on the reduction in electric resistance between electrodes by the reduction in thickness of diffusion layer due to the introduction of air bubbles are shown in FIG. 5, where the abscissa represents a conductivity of electrolyte, the ordinate a conductivity between electrodes, the full line a case where air bubbles are introduced between the electrodes at a superficial air velocity of 3 cm/sec, and the dotted line a case where no air bubbles are introduced, using the same test apparatus in the same manner as in the case of FIG. 3.

It is evident from FIG. 5 that, though the conductivity between the electrodes is increased with increasing conductivity of electrolyte, the former conductivity can be increased by more than 30% by the introduction of a small volumic rate of air bubbles (3 cm/sec in terms of the superficial air velocity), whereby the electric resistance of electrolyte can be reduced.

Figure 6:
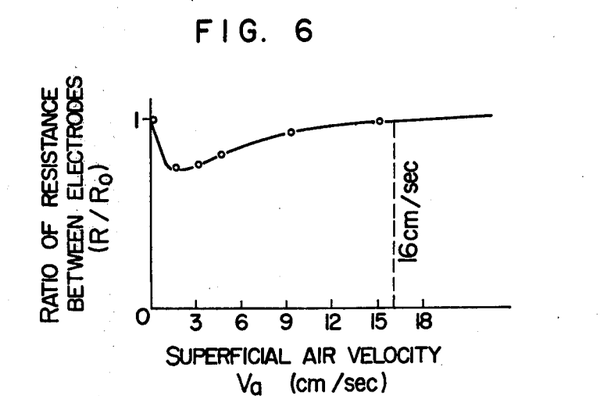
FIG. 6 is a graph showing relations between a superficial air velocity and a ratio of resistance between electrodes.

In FIG. 6, relations between a superficial air velocity $V_a$ when air bubbles are introduced to the dilution chambers and a ratio of resistance between electrodes (a ratio of a resistance R between the electrodes when air bubbles are introduced thereto to a resistance $R_o$ between the electrodes when no air bubbles are introduced thereto) are shown. It is evident from FIG. 6 that the superficial air velocity $V_a$ up to about 1 cm/sec is effective for reducing the thickness of said diffusion layer, and the resistance is reduced, whereas at the superficial air velocity above about 1 cm/sec an action of increasing the resistance becomes considerable owing to the presence of a gas-liquid mixed phase stream, and at the superficial air velocity above 16 cm/sec, the ratio of $R/R_o$ becomes more than 1, that is, the resistance between the electrodes becomes larger than when no air bubbles are introduced to the dilution chambers. Thus, the limiting current density can be increased by introducing air bubbles into the dilution chamber so that the superficial air velocity $V_a$ can be in a range of $0<V_a<16$ cm/sec through operation of valve 61 without any increase in the resistance between the electrodes, as shown in FIG. 3. Such volumic rate of air bubbles that the superficial air velocity $V_a$ can be in a range of $0<V_a<16$ cm/sec is equal to such a volumic rate of air bubbles as to make the thickness of a diffusion layer formed by concentration polarization near ion exchange membranes in dilution chambers smaller than when no air bubbles are introduced thereto, and make the resistance between the electrodes smaller than when no air bubbles are introduced thereto.

In the present invention, the resistance between the electrodes can be reduced in the electro-dialysis, and the limiting current density can be drastically increased to 5 times as high as that of the conventional art with no air bubbling, as is evident from FIG. 3. Since the current density can be increased to 5-fold, the treating efficiency can be increased to 5-fold even in an electrodialysis apparatus of the same specification as the conventional one.

It is desirable in view of the treating efficiency to use the superficial air velocity in a range of 1–4 cm/sec.

In the present invention, the ratio of limiting current density thus plays an important role. According to the present invention, it is meant that optimum volumic rates of air bubbles to be introduced to the dilution chambers, corresponding to the ratios of limiting current density as shown in FIG. 3 are determined before operation of the dialysis apparatus, and valve 61 is controlled according to the resulting characteristic data.

To conduct automatic control of valve 61, a value of the ratio of limiting current density shown on the axis of ordinate of FIG. 3 is calculated by calculator 83 on the basis of a value of the current passing through between the electrodes, detected by current detector 82, and valve 61 is controlled to the volumic rate of the air bubbles at the optimum superficial air velocity corresponding to the calculated value of the ratio of limiting current density.

However, the optimum superficial air velocity has an upper limit value of 16 cm/sec to make the ratio of resistances between the electrodes less than 1, as shown in FIG. 6, and thus it is desirable to provide a limitter in calculator 83 so that an output of calculator 83 to valve 61 may not produce a superficial air velocity of more than 16 cm/sec.

In the present invention, the absolute pressure of the electrolyte solution in the dilution chambers 14 is controlled to be equal to or less than the absolute pressure of the electrolyte solution in the concentration chambers 15 to keep the ion exchange membranes in the dilution chambers at a predetermined intermembrane distance, thereby ensuring the effect of the present invention due to the air bubbling. In this sense, supply of the air bubbles to the concentration chambers besides the dilution chambers is significant. The absolute pressure herein employed is the sum of static pressure and dynamic pressure.

Figure 7:
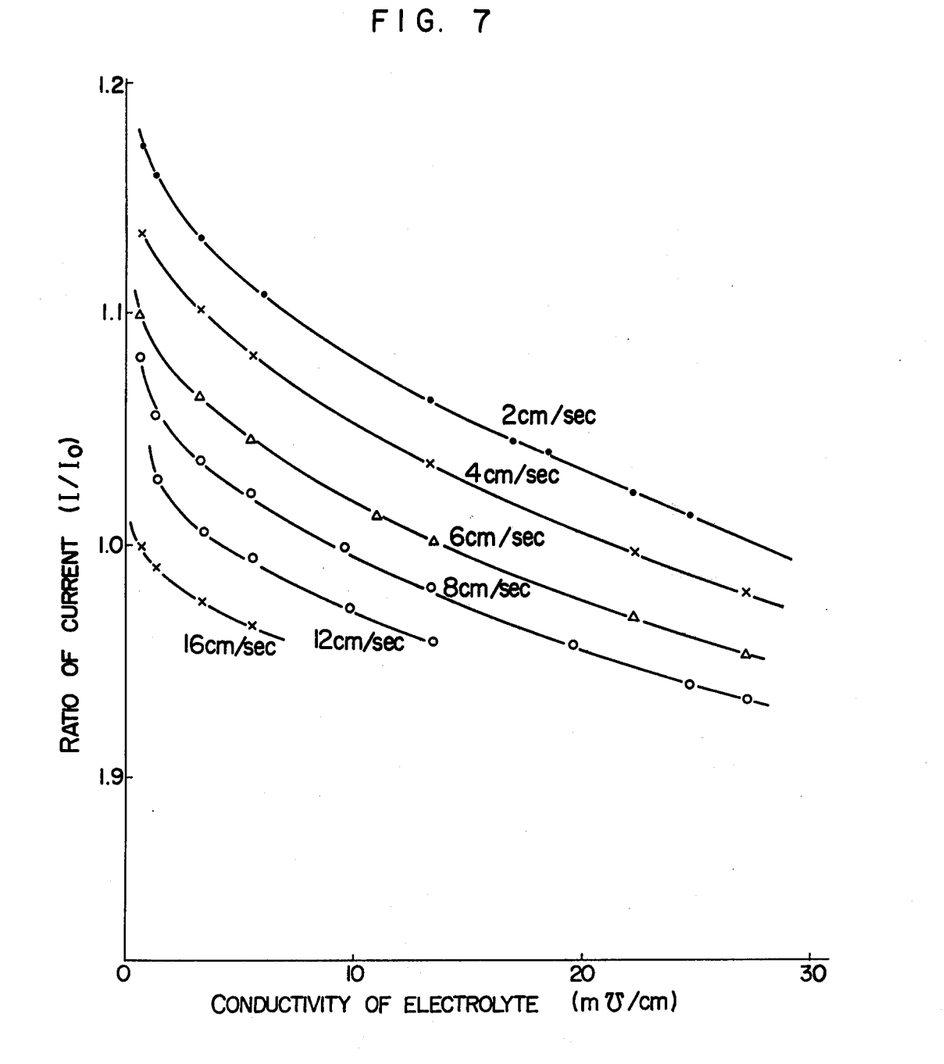
FIG. 7 is a graph showing relations between a conductivity of electrolyte and a ratio of a current when air bubbles are introduced to a current when no air bubbles are introduced.

In FIG. 7, relations between a conductivity of electrolyte and a ratio of current (a ratio of current I passing through both the electrodes when predetemined volumic rates of air bubbles are introduced to current $I_o$ when no air bubbles are introduced) are shown, where a test apparatus comprised of 3 dilution chambers, 2 concentration chambers and ion exchange membranes having an available membrane area of 64 $cm^2$/sheet at an intermembrane distance of 7 mm was used by passing an aqueous NaCl solution therethrough under an electric potential of 15 V. As is evident from FIG. 7, optimum volumic rates of air bubbles are obtained, if the values of conductivity of electrolyte and ratio of current are known. That is, the value of conductivity of electrolyte can be obtained from conductivity meter 60, and the value of ratio of current can be obtained in calculator 62. To conduct the optimum air bubble control, the output from calculator 62 controls the degree of opening of valve 61 until its deviation from the output from flow meter 63 becomes zero.

Electrodes are turned on in the following steps. At the start of operation, an air compressor 64 is actuated, and air bubbles are introduced into dilution chambers 14. Then, a switch in the controller is turned on to apply an electric potential to the electrodes. At the stopping of operation, the switch in the controller is turned off, and then the air compressor 64 is stopped to discontinue the introduction of air bubbles to the dilution chambers 14.

The foregoing operating conditions are based on the following grounds. The apparatus must be operated below the limiting current density so as not to damage the ion exchange membranes. According to the present invention, a higher limiting current density can be applied when the air bubbles are introduced to the dilution chambers than when no air bubbles are introduced. If a current applied at the air bubbling is passed through between the electrodes before the air bubbling is conducted, the current density exceeds the limiting current density applicable at the non-air bubbling, and consequently the ion exchange membranes are liable to be damaged. A controller for the current applied to the electrodes can be provided in the controller 80 or separately in another place.

As described above, the present invention provides a process for improving a treating rate of the dilute solution and concentrated solution and simultaneously solving problems inherent to the air bubbling in the electrodialysis apparatus based on the air bubbling.

Figure 8:
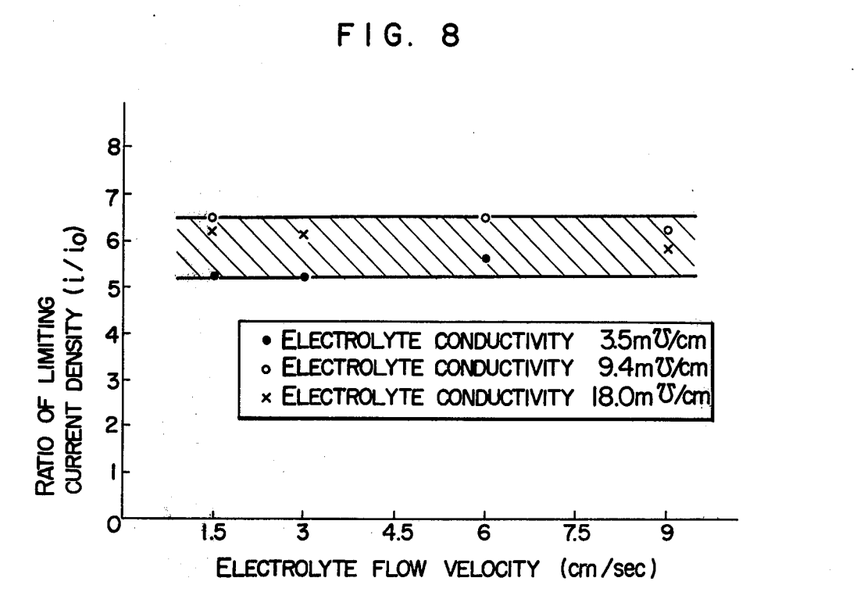
FIG. 8 is a graph showing relations between an electrolyte flow velocity and a ratio of limiting current density.

As is evident from FIG. 8, a higher current density can be obtained even at low electrolyte flow velocity in the dilution chambers in the present invention. Thus, it is desirable in view of the treating cost, that the superficial air velocity is set to 1–4 cm/sec.

What is claimed is:

1. In a process for electro-dialyzing an electrolyte solution in an electro-dialysis apparatus, comprising the steps of:
   providing a plurality of alternately counterposed cation exchange membranes and anion exchange membranes;
   providing a plurality of frames interposed between the ion exchange membranes, thereby forming dilution chambers and concentration chambers alternately between the counterposed ion exchange membranes;
   providing supply and discharge passageways for the electrolyte solution, through the frames, through which the electrolyte solution is introduced to and discharged from the respective dilution chambers and concentration chambers, providing supply and discharge passageways for air bubbles, formed through the frames, through which air bubbles are introduced to lower parts and discharged from upper parts of the dilution chambers;

applying an electric potential to a pair of electrodes respectively at both ends of the plurality of the dilution chambers and the concentration chambers, thereby diluting the electrolyte solution in the dilution chambers and concentrating the electrolyte solution in the concentration chambers by migration of ions due to electrophoresis of ions in the electrolyte solution and selective ion permeability of the ion exchange membranes;

passing electrolyte solution diluted in the dilution chambers and electrolyte solution concentrated in the concentration chambers through their respective chambers and passageways;

passing air through the air passageways so as to introduce air bubbles to the lower portions of the dilution chambers and discharge the air from the upper portions of the dilution chambers;

measuring the limiting current density ($i_o$) without air bubbles in the chambers;

monitoring the limiting current density (i) during operation when the air bubbles are introduced in the chambers;

determining the ratio of $i/i_o$;

measuring the electrical resistance between the electrodes ($R_o$) without air bubbles in the chambers;

monitoring the electrical resistance (R) between the electrodes during operation when the air bubbles are introduced in the chambers;

determining the ratio $R/R_o$; and controlling the superficial velocity of air bubbles (Va) through the dilution chambers during operation so that Va is maintained within the range of superficial air velocity that maintains $R/R_o$ less than one and $i/i_o$ constant and Va optimum with respect to both conductivity of electrolyte and resistance between electrodes, whereby the thickness of the diffusion layers formed by concentration polarization near the ion exchange membranes in the dilution chambers are maintained smaller than when no air bubbles are introduced thereto.

2. A process according to claim 1, wherein said step of controlling maintains the superficial air velocity of the air bubbles within the dilution chambers within the range of 1–4 cm/sec.

3. The process according to claim 1, including the steps of:
measuring the absolute pressures of the electrolyte solution in the dilution chambers and the concentration chambers; and
controlling the absolute pressure of the electrolyte solution in the dilution chambers to be equal to or lower than the absolute pressure of the electrolyte solution in the concentration chambers in accordance with the absolute pressures as measured.

4. The process according to claim 1, including the steps of measuring the absolute pressures of the electrolyte solutions in the dilution chambers and the concentration chambers, and controlling the flow rate of the electrolyte solution in the dilution chambers to be equal to or higher than the flow rate of the electrolyte solution in the concentration chambers in accordance with the absolute pressures of the electrolyte solutions as measured.

5. A process according to claim 1, wherein said step of controlling includes maintaining the superficial air velocity to a value of not more than 16 cm/sec.

6. A process according to claim 1, further including the steps of measuring the concentrations of the electrolyte solutions in the dilution chambers, and controlling the volume rate of air bubbles introduced into the dilution chambers in accordance with the concentration of the electrolyte solutions as measured.

7. A process according to claim 6, wherein said step of controlling the volumetric rate of air bubbles increases such rate with decreasing concentrations of the electrolyte solutions in the dilution chamber.

8. The process according to claim 7, wherein said step of controlling the superficial velocity maintains the superficial velocity of the air bubbles flowing in the dilution chambers to the range of 1–4 cm/sec.

9. The process according to claim 1, further including the steps of:
detecting the introduction of air bubbles to the dilution chambers;
supplying the electric potential to the electrodes only after the detection of the introduction of air bubbles to the dilution chambers;
detecting the stopping of the supplying of electric potential to the electrodes; and
discontinuing the introduction of air bubbles to the dilution chambers with the detection of the stopping of the supplying of electric potential to the electrodes.

10. The process according to claim 1, further including the steps of:
providing supply and discharge passages for air bubbles in the frames through which air bubbles may be introduced to the lower parts of and discharged from the upper parts of the concentration chambers; and
passing air bubbles through said concentration chambers during operation.

11. The process according to claim 2, further including the steps of:
providing supply and discharge passages for air bubbles in the frames through which air bubbles may be introduced to the lower parts of and discharged from the upper parts of the concentration chambers; and
passing air bubbles through said concentration chambers during operation.

12. The process according to claim 3, further including the steps of:
providing supply and discharge passages for air bubbles in the frames through which air bubbles may be introduced to the lower parts of and discharged from the upper parts of the concentration chambers; and
passing air bubbles through said concentration chambers during operation.

13. The process according to claim 1, further comprising the steps of:
providing supply and discharge passages for air bubbles in the frames through which air bubbles may be introduced to the lower parts of and discharged from the upper parts of the concentration chambers;

passing air bubbles through said concentration chambers during operation;

measuring the absolute pressures of the electrolyte solutions in the dilution chambers and the concentration chambers; and controlling the volumetric rate of the air bubbles in the dilution chambers to be equal to or higher than the volumetric rate of the air bubbles in the concentration chambers in accordance with the measured absolute pressures of the electrolyte solutions in the dilution chambers and the concentration chambers.

14. The process according to claim 4, further including the steps of:

providing supply and discharge passages for air bubbles in the frames through which air bubbles may be introduced to the lower parts of and discharged from the upper parts of the concentration chambers; and passing air bubbles through said concentration chambers during operation.

15. The process according to claim 14, wherein the air bubbles are introduced to the dilution chambers at a superficial air velocity of not more than 16 cm/sec.

16. The process according to claim 6, further including the steps of:

providing supply and discharge passages for air bubbles in the frames through which air bubbles may be introduced to the lower parts of and discharged from the upper parts of the concentration chambers; and passing air bubbles through said concentration chambers during operation.

17. The process according to claim 16, wherein the volumetric rate of the air bubbles is controlled to be increased with decreasing concentrations of the electrolyte solutions in the dilution chambers.

18. The process according to claim 17, wherein the air bubbles are introduced in the dilution chambers at a superficial velocity of 1–4 cm/sec.

19. The process according to claim 9, further including the steps of:

providing supply and discharge passages for air bubbles in the frames through which air bubbles may be introduced to the lower parts of and discharged from the upper parts of the concentration chambers; and passing air bubbles through said concentration chambers during operation.

* * * * *